(12) United States Patent
Tuma

(10) Patent No.: US 10,981,119 B2
(45) Date of Patent: Apr. 20, 2021

(54) GAS IN/OUTLET ADAPTER SYSTEM FOR A FILTRATION DEVICE

(71) Applicant: Siemens Healthcare Diagnostics Inc., Tarrytown, NY (US)

(72) Inventor: Claus Tuma, Lauf an der Pegnitz (DE)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 173 days.

(21) Appl. No.: 16/495,285

(22) PCT Filed: Feb. 18, 2017

(86) PCT No.: PCT/US2017/018540
§ 371 (c)(1),
(2) Date: Sep. 18, 2019

(87) PCT Pub. No.: WO2017/143309
PCT Pub. Date: Aug. 24, 2017

(65) Prior Publication Data
US 2020/0222857 A1 Jul. 16, 2020

Related U.S. Application Data

(60) Provisional application No. 62/296,686, filed on Feb. 18, 2016.

(51) Int. Cl.
*B01D 63/08* (2006.01)
*G01N 1/40* (2006.01)
(Continued)

(52) U.S. Cl.
CPC ............ *B01D 63/08* (2013.01); *G01N 1/4077* (2013.01); *G01N 35/0099* (2013.01);
(Continued)

(58) Field of Classification Search
CPC ............ B01D 2313/13; B01D 2313/26; B01D 63/08; B01D 63/087; B01D 67/0032;
(Continued)

(56) References Cited

U.S. PATENT DOCUMENTS 3,645,690 A 2/1972 Rochte et al.
3,930,598 A 1/1976 Slagle
(Continued)

OTHER PUBLICATIONS

International Search Report dated May 11, 2017 in corresponding PCT Application No. PCT/US2017/018540.

*Primary Examiner* — Terry K Cecil

(57) ABSTRACT

The invention relates to a gas in/outlet-adapter system for a container/rack assembly for a diagnostic robot comprising: —a receptacle (15) comprising a gas-inlet wherein the receptacle (15) is attached to a container (12), —a nozzle (16) comprising a gas-outlet wherein the nozzle (16) is attached to a rack to supply the container (12) via the receptacle (15) with a gas at a defined pressure level, wherein the receptacle (12) —provides one opening (24) —which provides for a fluidic contact to the interior of the container (12) —and a second opening (25) —which provides for a gas leak-proof connection to the nozzle (16) on the rack when the receptacle (15) is placed over the nozzle (16), and wherein the nozzle (16) —provides one opening (26) —which provides for a fluidic contact to a tubing system of the rack—and a second opening (27) —which provides for a fluidic contact to the nozzle (16) when the receptacle (15) is placed to cover the nozzle (15).

9 Claims, 3 Drawing Sheets

(51) Int. Cl.
*G01N 35/00* (2006.01)
*G01N 35/02* (2006.01)

(52) U.S. Cl.
CPC ....... *G01N 35/026* (2013.01); *B01D 2313/13* (2013.01); *B01D 2313/26* (2013.01); *G01N 2001/4088* (2013.01); *G01N 2035/00485* (2013.01)

(58) Field of Classification Search
CPC ... B01D 69/10; B01D 71/50; B01L 2200/026; B01L 2200/0689; B01L 3/523; G01N 1/4005; G01N 1/4077; G01N 2001/4088; G01N 2035/00277; G01N 2035/00475; G01N 2035/00485; G01N 2035/0412; G01N 35/00; G01N 35/0099; G01N 35/026; G01N 35/04
See application file for complete search history.

(56) References Cited

U.S. PATENT DOCUMENTS

| | | | |
|---|---|---|---|
| 4,911,847 A * | 3/1990 | Shmidt | B01D 9/00 |
| | | | 210/650 |
| 5,484,572 A | 1/1996 | Katakura et al. | |
| 2002/0009390 A1 | 1/2002 | Lappe et al. | |
| 2010/0035336 A1 | 2/2010 | Inana | |
| 2010/0173394 A1 | 7/2010 | Colston et al. | |
| 2010/0320134 A1 | 12/2010 | Zuk, Jr. | |
| 2012/0021435 A1* | 1/2012 | Hiltawsky | G01N 33/56966 |
| | | | 435/7.5 |
| 2012/0315664 A1 | 12/2012 | Friedrich et al. | |
| 2014/0110349 A1 | 4/2014 | Bangert et al. | |

* cited by examiner

GAS IN/OUTLET ADAPTER SYSTEM FOR A FILTRATION DEVICE

CROSS-REFERENCE TO RELATED APPLICATIONS

This application claims priority of U.S. Provisional Application No. 62/296,686, filed Feb. 18, 2016.

FIELD

The present invention generally relates to a gas in/outlet adapter system for a container and a rack wherein the rack provides utilities to a filtration device and wherein the filtration device comprises at least a container, a carrier, a filter membrane and a supporting body. The utilities comprise a gas, e.g. air at adjustable pressure. The filtration device preferably is the one described in US 2012/0315664, the disclosure of which is incorporated herein by reference in its entirety.

BACKGROUND

Microscopy is a widely used method in analysis. In particular in the field of "life sciences", it is an indispensable tool in order, for example, to characterize tissue and cells. Object carriers have become the established "interface" between the medium to be examined and the imaging components of a microscope. These are glass plates measuring 26×76 mm (ISO 8255-2) with a thickness of from 1 to 1.5 mm. The objects are, for example, applied to the object carrier in a thin layer and can be covered with a cover glass, which, as a rule, measures 18×18 mm and is 0.16 mm thick. Objects are, for example, sections of tissue surrounded by a film of liquid.

Filtration is also a widely used technique, in particular for separating solids of different sizes from each other and/or from liquids. When microscopy and filtration are combined, following the filtration process, the filtration residue can be examined microscopically.

To enable this process to be used routinely and inexpensively for medical diagnosis, for example during the examination of tumor cells filtered from a blood sample (see e.g. US-A-2012/021435 or US-A-2014/0110349), it is necessary to provide a simple and inexpensive solution, which can also be carried out by untrained personnel. Minimization of manual process steps also results in an improved potential for standardization and the avoidance of any impairment of the quality of the results.

US-A-2012/0315664 describes an improved assembly and method for the filtration of liquids. The assembly comprises a carrier, a filter membrane and a supporting body. The supporting body is arranged and/or formed in a recess of the carrier. The filter membrane is arranged evenly and/or flat on the supporting body.

The carrier typically is an object carrier, in particular for microscopy, which is made of glass or plastic, in particular polycarbonate. The supporting body can be textured, in particular porous. The texture determines the number of support points for the filter membrane and enables filtered liquid to drain off after passing through the filter membrane. The supporting body, likewise, can be made of plastic, in particular polycarbonate, or of a ceramic. The use of an object carrier as a carrier for the filter membrane facilitates simple handling and use in standard devices.

For filtration the object carrier is placed over a lid of a container so that the filter membrane/supporting body matches with a corresponding opening in the lid such that the gap between the object carrier and the opening in the lid is air sealed. The container is connected to tubes supplying the container with a gas at operator controlled super- and sub-atmospheric pressure, thereby allowing control of the filtration process as described e.g. in US-A-2014/0110349.

Typically, the container is a replaceable part of a rack. The rack can be placed in a diagnostic robot, e.g. a pipette robot which performs automated procedures such as pipetting one or more liquids from one or more reservoirs onto the object carrier which is reversibly fixed on the container lid. The object carrier and/or the container may then be transferred to an analyzing station inside or outside the robot.

So far, when placing the container including the object carrier in the rack the container has to be manually attached to the pressure/vacuum tubes provided by the robot. Typical robots provide the pressure and the vacuum at different but constant pressure levels—one level for the super and one level for the sub atmospheric pressure.

Thus, it is apparent that the above described procedure still requires a high degree of manual labor and skills, besides that there is still a risk that the manually attached tubes disconnect from the container during operation leading to an emergency stop of the diagnostic robot.

It was, therefore an object of the present invention to provide for an improved adapter system for a container/rack assembly for a diagnostic robot wherein the adapter system connects the gas/vacuum-outlet of a rack to a container of a filtration assembly comprising the container, a carrier, a filter membrane and a supporting body. Moreover, the adapter system should be designed to be used routinely and inexpensively for medical diagnosis, for example for the examination of tumor cells filtered from a blood sample. Accordingly, it was an object to develop a simple and inexpensive device, which can also be operated by untrained personnel without jeopardizing the quality of the diagnostic results.

SUMMARY

This object is achieved with a gas in/outlet-adapter system for a container/rack assembly for a diagnostic robot comprising:
- a receptacle comprising a gas-inlet wherein the receptacle is attached to a container
- a nozzle comprising a gas-outlet wherein the nozzle is attached to a rack to supply the container via the receptacle with a gas at a defined pressure level, wherein
  the receptacle
    provides one opening
      which provides for a fluidic contact to the interior of the container
    and a second opening
      which provides for a gas leak-proof connection to the nozzle on the rack when the receptacle is placed over the nozzle,
  and wherein
  the nozzle
    provides one opening
      which provides for a fluidic contact to a tubing system of the rack
    and a second opening
      which provides for a fluidic contact to the nozzle when the receptacle is placed to cover the nozzle.

Advantageous embodiments of the device according to the invention and its use may be derived from the respective dependent claims. The features of the main claim can be combined with the features of one or more dependent claims and the features of the dependent claims can be combined with features from other dependent claims.

BRIEF DESCRIPTION OF THE DRAWINGS

Preferred embodiments of the invention with advantageous developments according to the features of the dependent claims are explained in more detail below with reference to the figures, but without being restricted thereto.

The figures show.

DETAILED DESCRIPTION OF THE INVENTION

Figure 1:
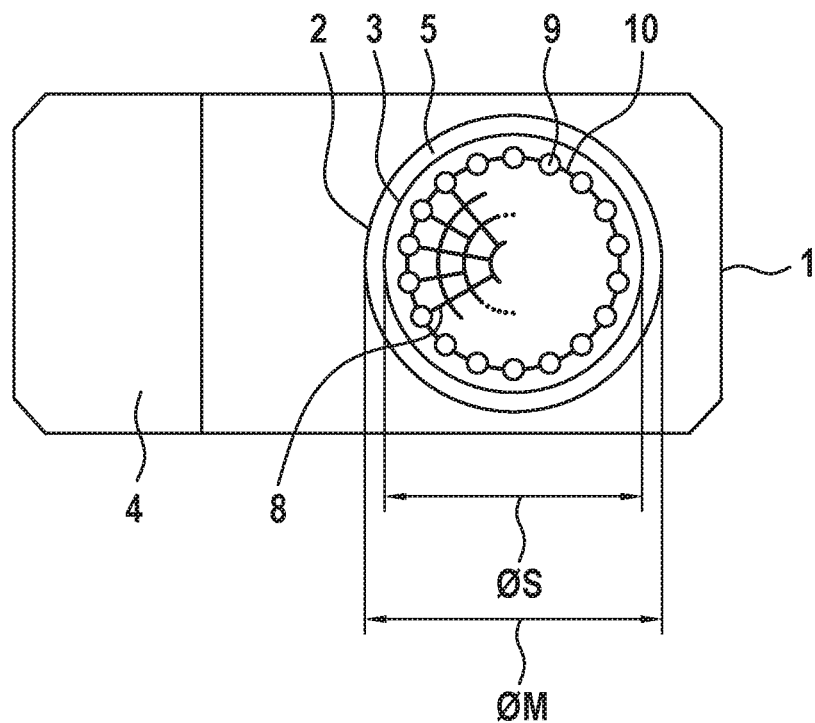
FIG. 1 a schematic representation of an object carrier including the filtration assembly in top view with a carrier, a supporting body and a filter membrane (not part of the present invention)

A "rack" is a standardized insert device for diagnostic robots which meets the size limitations set by the diagnostic robot, preferably by diagnostic robots from different manufacturers so that it can be used independently from the manufacturer of the given diagnostic robot. It fits the guide rail system of the inside of the robot (if present) so that it can be transferred to different pre-selected diagnostic stations within the robot. If necessary, the rack can be connected or is automatically connected upon insertion into the robot to utilities provided by the robot, such as electric power, digital and/or analog data input/output, fluids, gases etc. Racks can be provided for example for analytic test tubes, well plates or even hold complete diagnostic analytical devices.

The Filtration System

The object carrier including the filtration assembly is described in detail in US-A-2012/0315664, and comprises a carrier, a filter membrane and a supporting body. The supporting body is arranged and/or formed in a recess of the carrier. The filter membrane is arranged evenly and/or flat on the supporting body.

During filtering, the supporting body provides mechanical support for the filter membrane, thus enabling large quantities of liquid to be filtered in a reasonable time. Filter membranes, which can only be embodied as very thin, are, for example, filter membranes produced by particle bombardment from films with precisely defined through-pores or holes. Good support with the aid of the supporting body in the form of numerous, uniformly distributed support points is essential for the use of filter membranes of this kind as filters.

The carrier can have a thickness in the region of 1 to 1.5 mm, a length in the region of 75 to 76 mm and a width in the region of 25 to 26 mm. The filter membrane can have a thickness in the region of 1 to 20 µm, preferably in the region of 10 µm, and a diameter in the region of 25 mm. These dimensions make the carriers suitable for use in the most commonly used holdings in standard devices for object carriers.

The recess in the carrier can have the same size as the supporting body. This facilitates good holding of the supporting body in the carrier. On the other hand the supporting body can be produced integrally from the carrier material. In the second case, a permanently stable assembly is achieved. The supporting body can have a circular design and the filter membrane can also have a circular design. This facilitates use in systems with circular feed pipes and circular discharge pipes for fluids. A round embodiment also facilitates microscopy, because the entire circular region can be optically resolved in the microscope's field of view.

The supporting body can comprise channels formed on a side facing the filter membrane, which are in fluidic contact with the filter membrane. These channels facilitate good drainage of the filtered liquid from the filter membrane and hence good passage of liquid to be filtered through the filter membrane.

The filter membrane can be a track etched filter membrane made of polycarbonate film and comprises holes with a diameter of micrometers, in particular 8 µm and a hole density of 1% to 80% (as the ratio of the perforated area to the overall area), in particular a hole density of 105 holes per square centimeter.

The assembly shown in FIG. 1 comprises a carrier (1) and a supporting body (3) arranged in a recess of the carrier (1). The carrier (1) is embodied as even in the form of an object carrier for light microscopy. In a region disposed at a distance from supporting body (3), an area can be embodied as a grip (4) in that the surface is roughened, for example, in this region.

Figure 2:
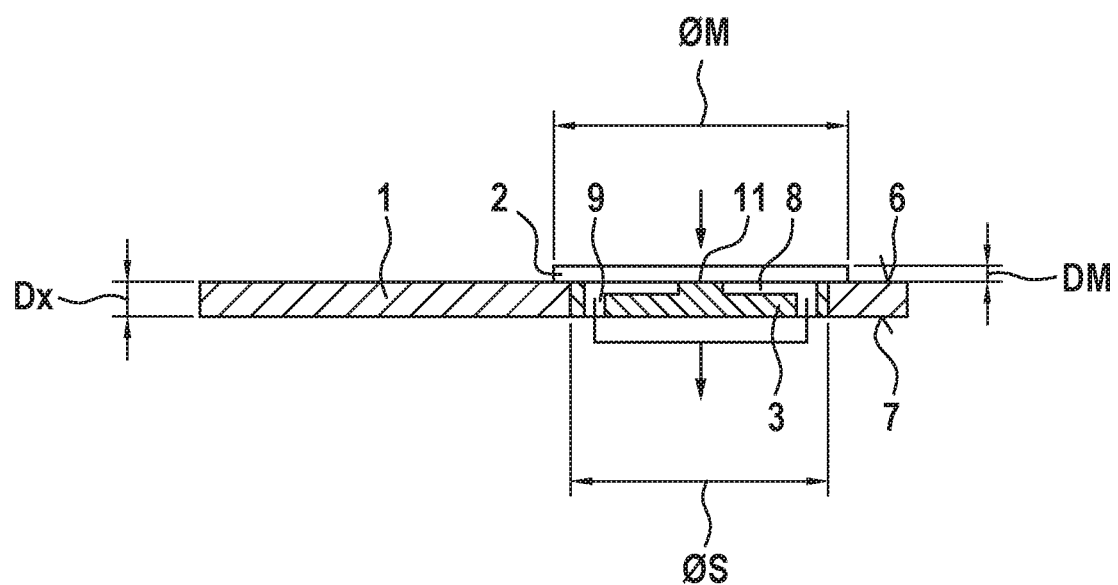
FIG. 2 a schematic sectional view through the assembly shown in FIG. 1 (not part of the present invention)

As FIGS. 1 and 2 show, a circular, film-type filter membrane (2) is arranged evenly on a front side (6) of the carrier (1) and the supporting body (3). The circular filter membrane (2) has, for example, a circular diameter ØM in the region of 25 mm and a thickness DM in the region of 10 µm. In the edge region (5), the filter membrane (2) is mechanically connected to the carrier, for example by welding or adhesion. The circular supporting body (3) is arranged below the filter membrane (2). The supporting body has, for example, a circular diameter ØS in the region of 23 mm and a thickness Dx corresponding to the thickness of the carrier. The filter membrane (2) lies evenly on the supporting body (3), wherein deviations from a planar contact surface between the supporting body (3) and filter membrane (2) can be, for example, maximum 100 µm. The supporting body (3) and the carrier (1) can be formed as one integral piece or the circular supporting body (3) can be arranged in a circular recess passing right through the thickness Dx of the carrier, in particular connected in a mechanically stable way to the carrier (1). In addition to circular shapes of the supporting body (3) and the recess, other shapes, for example rectangular or triangular shapes, are possible. A positive contact between the supporting body (3) and the recess of the carrier (1) is of advantage here.

As shown in FIGS. 1 and 2, channels (8) are formed in the surface of the supporting body (3) on a front side (6). In order to keep the channel density of the channels (8) on the surface in the direction of edge region (5) substantially constant, the number of channels (8) increases in the direction of the edge (5) going from the mid-point (11).

Drainage holes (9) passing completely through the thickness Dx of the carrier (1) or supporting body (3) are arranged close to the edge region (5) of the filter membrane (2) in the supporting body (3) or in the carrier (1) or in the contact region between the supporting body (3) and carrier (1). The channels (8) end in the drainage holes (9). Fluid flowing through the filter membrane (2) can come through the channels (8) and the drainage holes (9) from the front side (6) of the carrier (1) and arrive at the rear side (7) of the carrier (1) and be transported away from there. Good uniform passage through filter membrane (2) and good filtering of the fluid are facilitated. In particular, a uniform pressure drop over the entire filter membrane surface is achieved.

Alternatively, if ceramic is used as the material for the supporting body (3), a porous layer can be formed on the surface of the supporting body (3), which, similarly to channels (8) or (10), permits uniform drainage of a fluid. If the supporting body (3) is completely made of a porous material, the drainage holes (9) and channels (8) or (10) can be provided by the porosity.

The Container

The container's main object is to receive the filtrate leaving the rear side (7) of the carrier (1) and to provide a stable support for the filtration assembly holding it in a fixed, predetermined position so that it can reliably be accessed by the various tools of the robot.

Figure 3:
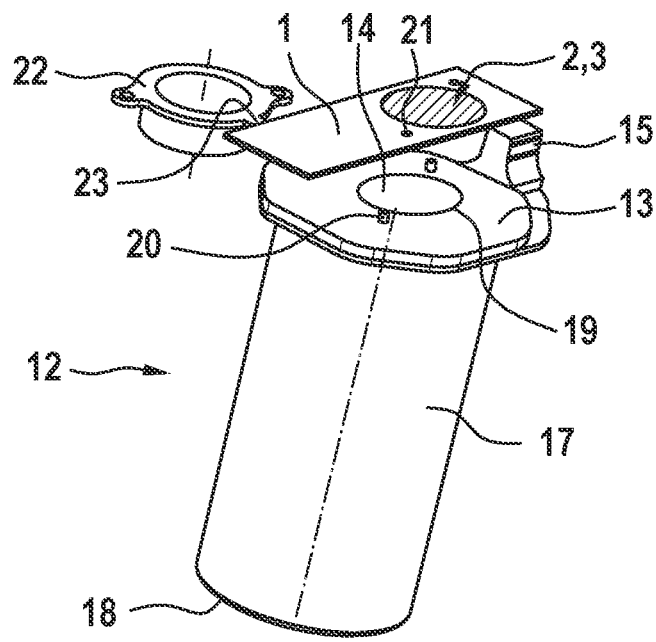
FIG. 3 a perspective view of a container

FIG. 3 shows the container (12) for a rack of a diagnostic robot comprising: a container (12) with top (13) and object carrier (1) in place.

The container (12) comprises a container body (17) comprising a sidewall or multiple sidewalls, a bottom (18) and a top (13) wherein the container body (17) is of round, oval, square, rectangular, hexagonal or polygonal cross sectional shape. The top (13) can be designed as an integral part of the container (12) as a unit of container body (17), bottom (18) and top (13) in which case the top (13) is preferably welded to the container body (17), but it can also be designed as a separate part (a lid) which removably covers the container (12). The top (13) is further provided with an opening (14) that matches the size and form of the filter membrane/supporting body (2, 3) of the object carrier (1) which is placed over the opening (14) in the top (13) of the container (12) for filtration of a sample. The gap between the object carrier and the opening (14) in the top (13) preferably is air sealed which can be established with an appropriate flexible ring (not shown) which is fixed on the rim (19) of the opening (14) or which is an integral part of top (13).

In order to lock the object carrier (1) with a predetermined surface faced up into a predetermined position on the top (13) the top (13) is provided with a top-guiding-means (20) which matches with a corresponding object-carrier-guiding-means (21) on or in the object carrier (1). For example, the top-guiding-means (20) can have the form of elevations in the container top (13) and matching depressions in the object carrier (1) or vice versa or at least one pair of an elevation and a depression in the container top (13) matching with at least one corresponding elevation/depression pair in the object carrier (1).

Preferably, the container (12) is further equipped with a removable funnel/fixture (22) which prevents an inadvertent displacement of the object carrier (1) and which can at the same time serve as a funnel-like reservoir for the to be filtered medium. The cross-section and form of the funnel/fixture (22) is preferably adapted to the cross-section and form of the supporting body (3) and filter membrane (2) in the object carrier (1). In a preferred embodiment the funnel/fixture (22) is attached to the top (13) via a connecting band or ribbon (23).

The Gas in/Outlet Adapter System

The container (12) is equipped with an adapter/receptacle (15) which matches a gas outlet/nozzle (16) on the rack. The terms "adapter" and "receptacle" are used herein interchangeably defining the same part; the same applies to the terms "outlet" and "nozzle".

The location of the adapter (15)/outlet (16) pair is not critical but should preferably be in an area where the risk of contamination with filter products is minimal, e.g. on the upper part of the container body (17) (with the matching outlet (16) on the rack being positioned so as to match with the adapter (15) on the container (12)).

Figure 4A:
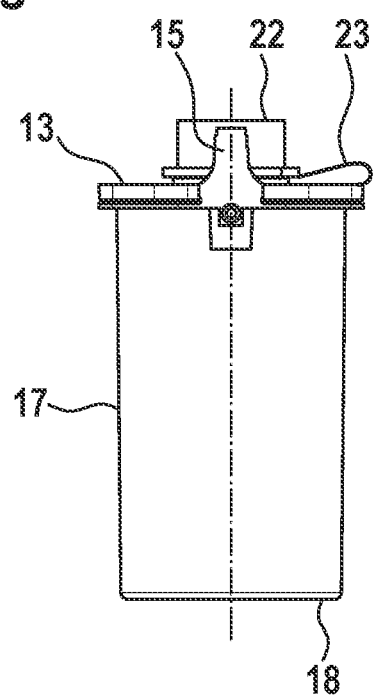
FIGS. 4a and 4b views of a container with receptacle attached to the container
Figure 4B:
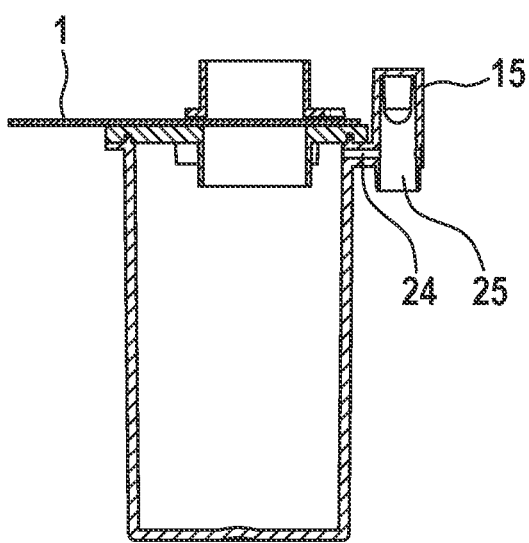
Figure 5:
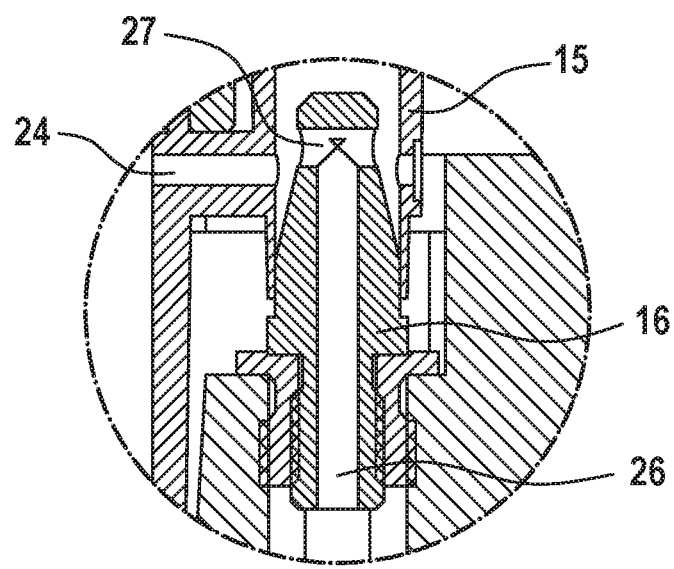
FIG. 5 a blown-up cross-sectional view of the gas in/outlet adapter system

As shown in FIGS. 4 and 5 the gas in/outlet-adapter system comprises a receptacle (15) on the container (12) and a nozzle (16) on the rack.

The receptacle (15) is attached to the container (12), preferably on the upper part of the container body (17). A location in the upper third part, preferably upper tenth part of the container body (17) is preferred, where the risk of contamination with filter products is minimal. The attachment can be accomplished e.g. by welding, gluing or a screwed connection.

The nozzle (16) is arranged on and extends from the outer surface of the rack so that the container (12) with its adapter (receptacle) (15) establishes a gas leak-proof connection with the nozzle (16) when the receptacle (15) is placed over the nozzle (16) when the container (12) is inserted into the rack. The nozzle (16) is in fluidic contact with a tubing system inside the rack. Preferably, the nozzle (16) is connected to the tubing system via a screwed connection.

The receptacle (15) and nozzle (16) are each formed so that a gas leak-proof connection is formed at the opening (25) of the receptacle (15) when the receptacle (15) is placed over the nozzle (16) and covers it. Such a connection can be established e.g. with a cone-shaped nozzle (16) and a cylindrical receptacle (15), wherein the top (=smaller) diameter of the nozzle (16) is smaller than the inner diameter of the cylindrical receptacle (15) and wherein the lower (=bigger) diameter of the cone-shaped nozzle (16) is about 0.1 to 10% bigger than the inner diameter of the cylindrical receptacle (15). Of course the receptacle (15) may exhibit other shapes than cylindrical, as long as the opening (25) is reversibly leak-proof closed when the receptacle (15) is placed over the nozzle (16) and covers it. In a preferred embodiment the receptacle (15) and nozzle (16) are provided with a groove and tongue system (not shown) so that the receptacle locks into position when it is placed over the nozzle (16) and covers it.

The receptacle (15) has one opening (24) which provides for a fluidic contact to the container (12). The contact is established via a pipe or—if the container body (17) is in direct contact with the receptacle (15)—via a drill bore through the container body (17) and the receptacle (15). The connection is preferably located in the upper third of the receptacle (15) to avoid interference with the nozzle (16) when the receptacle is placed over the nozzle (16) and covers it.

The receptacle has a second opening (25) which establishes a gas leak-proof connection to the nozzle (16) when the receptacle (15) is placed over the nozzle (16).

The nozzle (16) has one opening (26) which provides for a fluidic contact to a tubing system inside the rack (not part of this invention) and a second opening (27) which establishes a fluidic contact to the receptacle (15) when the receptacle (15) is placed to cover the nozzle (16).

The opening (26) in the bottom of the nozzle (16) extends into a vertical bore leading from the bottom of the nozzle all the way to and extending through the top of the nozzle (16). In an alternative embodiment (shown in FIG. 5) the vertical bore leads from the bottom of the nozzle (16) to an area close to the top but not extending through the top of the nozzle (16). At the upper end of the vertical bore the outer surface of the nozzle (16) is provided with a horizontal annular groove extending into the nozzle (16). The inside of the groove exhibits one or more holes extending into the vertical bore.

The nozzle's and the inner receptacle's cross sectional shape is not critical. Both can in principal have any cross sectional shape, like round, oval, square, rectangular, hexagonal or even polygonal, however it seems that a round cross sectional shape (i.e. cylindrical or cone shaped) is the most economic and useful shape, which is, therefore, preferred. Likewise both can be made of nearly any material. Most common materials used are polyethylene, polypropylene, polyamide, polycarbonate, polystyrene and the like or metal, like stainless steel. Since the nozzle (16) is permanently installed on the rack it is preferred to make the nozzle (16) of a metal, like stainless steel. The outer shape of the receptacle (15) can be chosen differently and independently from its inner shape. It is preferred to select a more edged shape to provide for a better grip. In this case the receptacle can be used as a handle for the container (12) which facilitates the placement of the filtration device (comprising the container) into the rack.

The Rack

Figure 6:
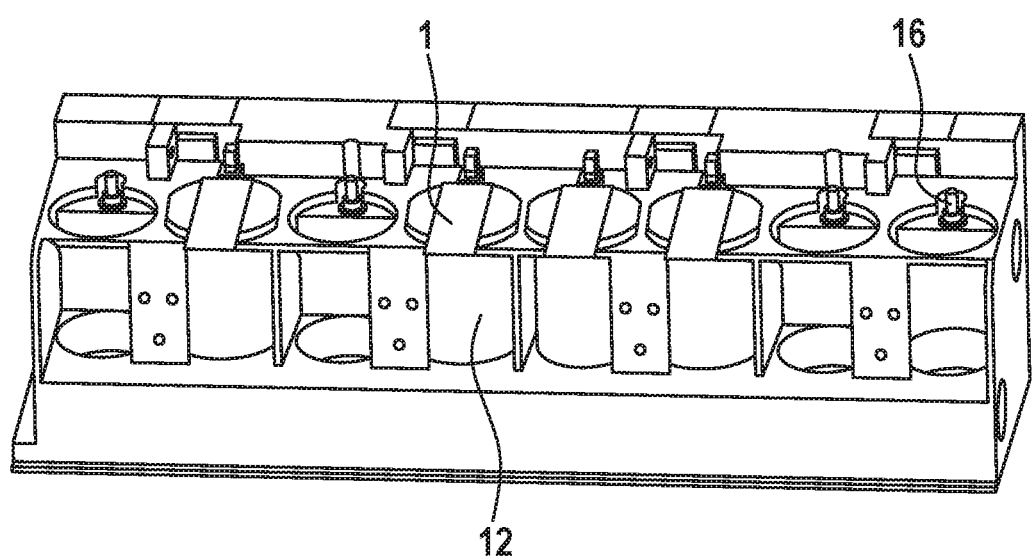
FIG. 6 a 3D picture of an embodiment of the rack with 4 containers inserted and 4 free nozzles

The rack—an embodiment of which is shown in FIG. 6—provides support for one or more, preferably up to eight containers (12) e.g. for performing lysis and filtration of whole blood samples. The containers (12) hold the filtrates and the tops (13) are designed to hold an object carrier (1) each, wherein the object carrier (1) includes a filtration assembly (2, 3).

The rack provides an outlet (16) (nozzle) for each container for a gas, preferably air, at a pre-defined, adjustable pressure level.

Use

With the above-described gas in/outlet-adapter system in connection with the described filtration assembly and rack whole blood samples can be filtered. This separation predominantly isolates circulating rare cells with some white blood cells and no red blood cells. After isolating the cells, the cells are fixed and washed. The filtration process can be stopped (by applying super-atmospheric pressure to the container) e.g. for bio banking slides with rare cells or can be continued with automated procedures for e.g.: molecular detection of proteins by immunocytochemistry (ICC); RNA in-situ hybridization (ISH); or cytological morphology by chromogenic dye staining (H&E). Alternatively the carriers can be used to extract cellular material for other detection methods which are not automated in the given procedure, such as PCR or FISH analysis for DNA or automated immunoassays.

The method allows cells to be fixed with formaldehyde and permeabilized with detergent to help expose intracellular antigens. The method also allows series of wash steps to wash away unbound antibody and probe, blocking steps to reduce non-specific binding and incubation steps for multiple step assays. The methods further allows using DAPI (4',6-diamidino-2-phenylindole), a fluorescent DNA stain to stain the nuclei of the cells and the application of cover media to help preserve the fluorescent intensity of the probes.

LIST OF REFERENCE NUMBERS (1) carrier
(2) filter membrane
(3) supporting body
(4) grip (of carrier)
(5) edge region (of filtration assembly)
(6) front side (of carrier)
(7) rear side (of carrier)
(8) channels (of filtration assembly)
(9) drainage holes (of filtration assembly)
(10) channels (of filtration assembly)
(11) mid point (of filtration assembly)
(12) container
(13) top
(14) top opening
(15) adapter, receptacle (on container)
(16) pressure outlet, nozzle (on rack)
(17) container body
(18) container bottom
(19) rim
(20) top-guiding-means
(21) object-carrier-guiding-means
(22) funnel/fixture
(23) ribbon
(24) receptacle opening to container (12)
(25) receptacle opening to nozzle (16)
(26) nozzle opening to tubing system inside rack
(27) nozzle opening to receptacle (15)

The invention claimed is:

1. A gas in/outlet-adapter system for a container/rack assembly for a diagnostic robot comprising:
a receptacle (15) comprising a gas-inlet wherein the receptacle (15) is attached to a container (12),
a nozzle (16) comprising a gas-outlet wherein the nozzle (16) is attached to a rack to supply the container (12) via the receptacle (15) with a gas at a defined pressure level,
wherein
the receptacle (12)
provides one opening (24)
which provides for a fluidic contact to the interior of the container (12)
and a second opening (25)
which provides for a gas leak-proof connection to the nozzle (16) on the rack when the receptacle (15) is placed over the nozzle (16),
and wherein
the nozzle (16)
provides one opening (26)
which provides for a fluidic contact to a tubing system of the rack
and a second opening (27)
which provides for a fluidic contact to the nozzle (16) when the receptacle (15) is placed to cover the nozzle (16).

2. The gas in/outlet-adapter system according to claim 1, wherein the nozzle (16) is cone-shaped.

3. The gas in/outlet-adapter system according to claim 2, wherein the receptacle has an inner diameter and the inner diameter is cylindrical.

4. The gas in/outlet-adapter system according to claim 3, wherein the nozzle (16) has a top diameter and a lower diameter, wherein the top diameter of the nozzle (16) is smaller than the inner diameter of the receptacle and wherein the lower diameter of the nozzle (16) is about 0.1% to about 10% bigger than the inner diameter of the receptacle.

5. The gas in/outlet-adapter system according to claim 1, wherein the container has a longitudinal axis and wherein the receptacle (15) and nozzle (16) are in a parallel relationship to the longitudinal axis of the container.

6. The gas in/outlet-adapter system according to claim 1, wherein the opening (26) of the nozzle (16) extends into a vertical bore, wherein the vertical bore leads from a bottom of the nozzle (16) to an area close to a top but not extending through the top of the nozzle (16), and wherein the nozzle (16) is provided with a horizontal bore intersecting the vertical bore.

7. The gas in/outlet-adapter system according to claim 6, wherein the container has a longitudinal axis and wherein the vertical bore of the nozzle (16) is in a parallel relationship with the longitudinal axis of the container.

8. The gas in/outlet-adapter system according to claim 1, wherein both the receptacle (15) and the nozzle (16) are made of polyethylene, polypropylene, polyamide, polycarbonate, polystyrene or metal.

9. A filtration device comprising the gas in/outlet-adapter system according to claim 1 and a filtration assembly attached to a gas pressure system in the rack via the receptacle (15) and the nozzle (16).

\* \* \* \* \*